Oct. 25, 1966

G. W. RYE 3,280,617

METHOD AND APPARATUS FOR MEASURING
PROPERTIES OF REINFORCEMENT CORDS

Filed July 13, 1964

2 Sheets-Sheet 1

INVENTOR.
GROVER W. RYE
BY
J. B. Holden
ATTORNEY

FLATSPOTTING
TIRE DATA vs. LAB DATA

INVENTOR.
GROVER W. RYE

BY

J.B. Holden
ATTORNEY

United States Patent Office 3,280,617
Patented Oct. 25, 1966

3,280,617
METHOD AND APPARATUS FOR MEASURING PROPERTIES OF REINFORCEMENT CORDS
Grover W. Rye, Cuyahoga Falls, Ohio, assignor to The Goodyear Tire & Rubber Company, Akron, Ohio, a corporation of Ohio
Filed July 13, 1964, Ser. No. 382,187
9 Claims. (Cl. 73—15.6)

This invention relates to the testing of reinforcement cord and in particular it relates to a method and apparatus useful in predicting the flat spotting characteristics of pneumatic tires.

In recent years there has been considerable interest in overall riding qualities of tires. The smoothness of ride, level of tire noise, and tire thump all have been investigated in one way or another. One of the most intriguing phenomena in tire performance is flat spotting. Although flat spotting in itself is not detrimental from the serviceability of a tire, probably no other single esthetic item has been so thoroughly investigated. Flat spotting is a temporary deformation of a tire caused by parking a vehicle upon which the tire is mounted for a period of time. As the vehicle is subsequently operated the flat spotting diminishes in magnitude and after a few miles of running it disappears.

Figure 1:
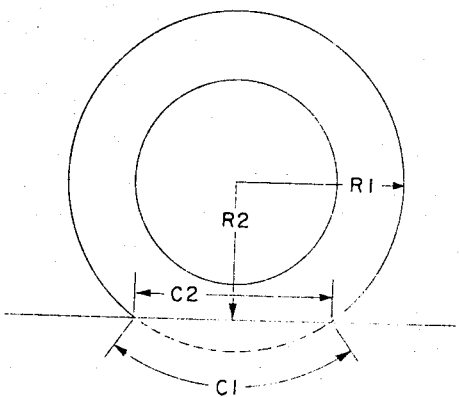
Figure 2:
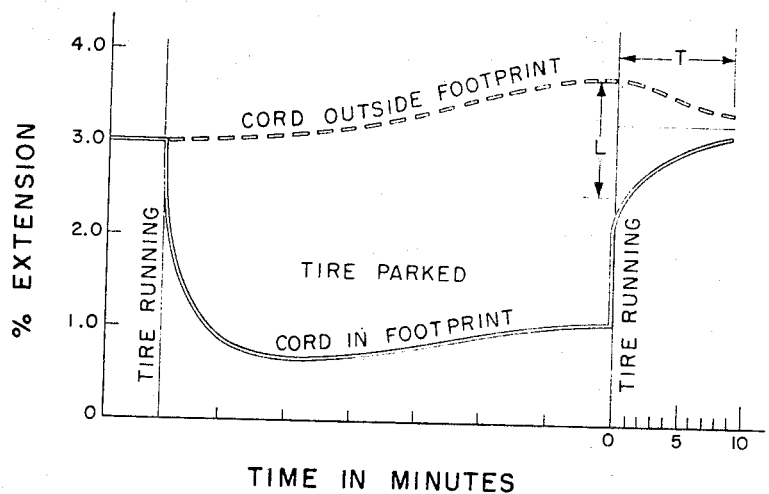
Figure 3:
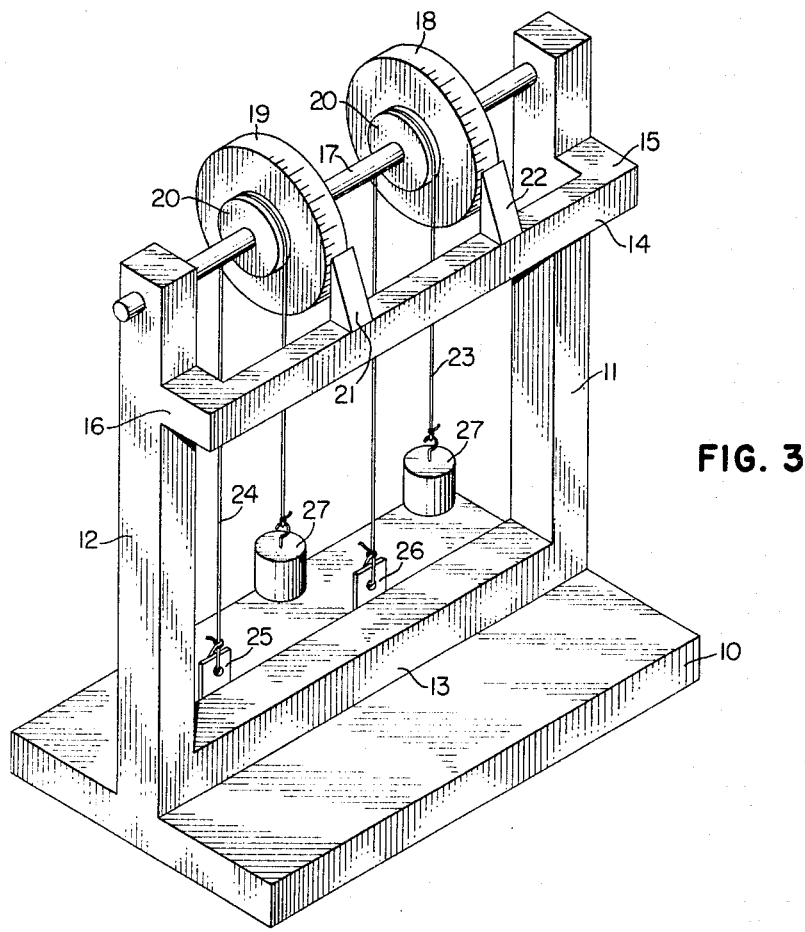
Figure 4:
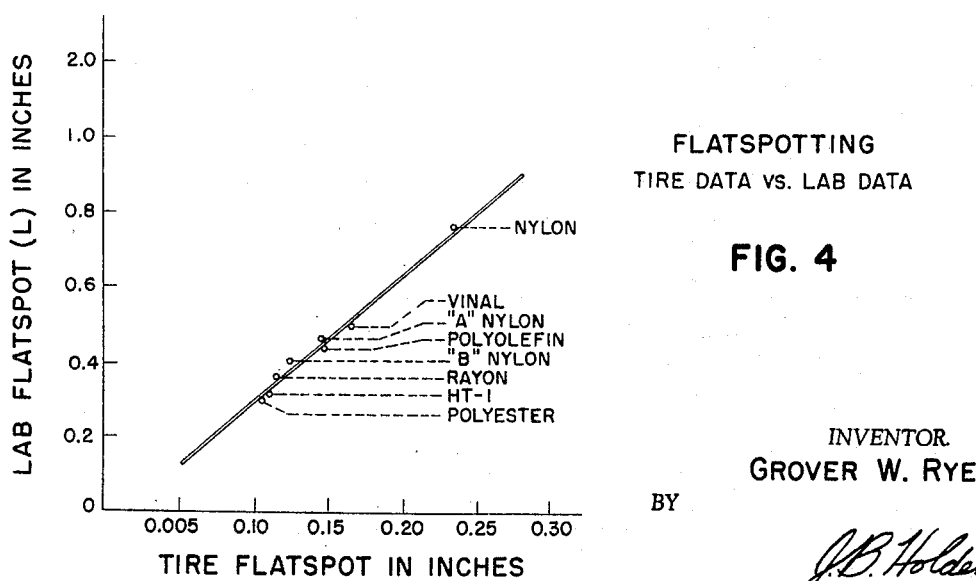

The primary object of this invention is to provide apparatus, including a test specimen thereon, and a method for determining the physical properties of a tire reinforcement material, thus enabling a prediction to be made as to its flat spotting characteristics. Other objects will become apparent when the following material is taken in conjunction with the drawings in which: FIGURE 1 shows a line sketch illustrating a loaded tire. FIGURE 2 shows a graph depicting the condition of the cords within the tire during and after running. FIGURE 3 shows the apparatus used in testing tire reinforcement cords to determine their flat spotting characterisstics. FIGURE 4 shows the straight line correlation between the lab test data and actual tire data.

To better understand the mechanism of flat spotting reference is had to FIGURE 1 which illustrates a loaded tire. If the tire behaved in a manner similar to a steel wheel then R1, the inflated radius, would be the effective radius of the tire. However, it is well known that a tire deflects and the effective radius is not R1 but is a shorter distance represented as R2 in FIGURE 1. In a similar manner C1 represents the length of the arc or tread of the radius R1. The true length of the footprint is much shorter as shown by C2. From FIGURE 1 it is readily apparent that the footprint, or ground contact area, of a tire is in compression. Portions of the reinforcement cord in the footprint area may also be relieved of all tension, or at least substantially so. In contrast the reinforcement cords in the tire outside of the footprint area are in a state of tension produced by the inflation pressure within the tire.

In addition to the stresses produced by the internal pressure and the configuration of the loaded tire, the cords are subjected to varying thermal conditions. The ordinary tire remains at ambient temperatures except when operated under normal conditions when it can be expected that a temperature in the range of 150° F. will occur.

FIGURE 2 shows what can be expected to occur in a typical tire employing a reinforcement cord made from, for example, nylon. The cord outside the footprint is represented by the line at the top of FIGURE 2. The cords outside the footprint have reached an equilibrium length during the operation of the tire. The running state is shown at the left of FIGURE 2. When the tire is parked, the tire cools, consequently the cords exhibit a tendency to grow as the thermal shrinkage forces decay, until a new equilibrium is reached in the cold tire. This is entirely consistent with the behavior of a nylon cord since it shrinks when heat is applied thereto. As the tire again begins to run again the cords retract as the temperature increases because of the increase in thermal shrinkage.

On the other hand the cords in the footprint area react in a very different manner. The lower curve in FIGURE 2 shows the behavior of the cords when the tire is parked. The cord is placed in a state of compression as compared to the cords outside the footprint. When the tire is once again run the cords in the footprint do not immediately attain the exension that is in the cords remote from the footprint area.

After the tire has been run for a few minutes, a state of equilibrium is reached. FIGURE 2 shows "L" as the amount of difference between the extension in the cords located outside the footprint and the cords in the footprint. It is this difference in the tire radius that produces a flat spot in the tire. As the tire runs the flat spot diminishes until it is no longer noticeable. The time required for the flat spot to no longer be noticeable is known as the runout time and is represented in FIGURE 2 as "T."

The above paragraphs have shown the two basic features that contribute heavily to the flat spotting phenomenon. First, the response of the reinforcement cord when subjected to the application and release of a load and second the reaction of the cord when subjected to heat. Of particular importance is the rates with which these changes occur.

Heretofore flat spotting characteristics of a new or different tire reinforcement cord had to be built into a tire, then the tire had to be cycled through running and parking cycles while the flat spotting deformation and other characteristics were observed and recorded. The following outlines a procedure and apparatus whereby the flat spotting characteristics of a given material can be measured before it is incorporated into a tire.

THE APPARATUS

The apparatus utilized in testing reinforcement cords is shown in FIGURE 3. A base 10 is provided so that the test apparatus can be positioned in a vertical attitude without danger of falling over. Upright members 11 and 12 are mounted on the upper surface of base 10. Members 11 and 12 are additionally held in spaced relationship with respect to each other by cross-members 13 and 14. Lower cross-member 13 spans the distance between upright members 11 and 12 and is also resting on base 10. Upper cross-member 14 is also rigidly attached to upright members 11 and 12 through arms 15 and 16. At the top of upright members 11 and 12 a shaft 17 is secured in an immovable position. Shaft 17 carries mounted thereon rotatable disc assemblies 18 and 19. Discs 18 and 19 are larger in diameter than disc 20, which are affixed thereto. The outer periphery of discs 18 and 19 contain calibrated increments representing for example inches or centimeters. Discs 20 are attached to 18 and 19 so that when rotation takes place both small and large discs will travel through the same angle of rotation. By having a small disc for the specimen support and a large disc for the calibration scale a finer reading of the cord extension can be attained. A radius ratio of 1 to 3 provides a convenient arrangement. In order to provide a convenient reference point for taking readings on calibrated discs 18 and 19, indicators 21 and 22 are rigidly mounted on cross-member 14. The top edge of indicators 21 and 22 is positioned so that it forms a horizontal sight line adjacent the scale on the periphery of discs 18 and 19.

Test samples of reinforcement cord such as 23 and 24 are anchored at their lower end to bars 25 and 26, which in turn are rigidly attached to lower cross-member 13. The test cords 23 and 24 are trained in a vertical direction until they contact the tangent point of discs 20. The cords are then laid on the top peripheral half of disc 20 and attached to weights such as 27. It is evident that when cords 23 and 24 mounted as described above and shown in FIGURE 3, any deformation thereof will cause calibrated discs 18 and 19 to rotate upon fixed shaft 17.

TEST PROCEDURE

Since moisture and pre-tension are very important factors in the flat spotting characteristics of many fibers, the samples chosen for testing are permitted to relax for approximately 24 hours in a desiccator at 75° F. Two identical cords are removed from the desiccator and securely attached to bars 25 and 26, as shown in FIGURE 3. The cords are then trained over discs 20 and pre-tensioned under a 10 gram load. Care must be exercised so that moisture is not imparted to the cords while mounting them in the test apparatus. The entire test apparatus and the tensioned cords are placed in an oven at 150° F. The pre-tension load of 10 grams is increased to a 908 gram load after the cords have been subjected to the 10 gram load until the rate of extension no longer exceeds 0.05% over a time interval of 5 minutes. The 908 gram load is maintained on the cords until equilibrium is attained. When the above equilibrium is reached one weight is removed from one cord and both cords, including the test apparatus, are allowed to cool to room temperature or 75° F. Readings are taken as the weight is removed and at 10 minute intervals thereafter.

After the cords have reached equilibrium at room temperature, the 908 gram load is once again applied to the relaxed cord and the temperature is raised to 120° F. over a total time span of 10 minutes. Readings of both cords are taken immediately and at one minute intervals.

The differential in length change between the cord that had the weight removed and the cord that did not have the weight removed provides the initial differential "L" as shown in FIGURE 2. The value "L" has been assigned as the flat spotting index and the curve of the extension represents the runout rate. The runout is cut off when a differential of 0.30% is attained. This would correspond to the point where if the cord were in a tire the flat spot caused by the cord would no longer be noticeable to the vehicle occupant.

CORRELATION WITH TIRE FLAT SPOTTING

The "L" and "T" values for several potential reinforcement cord materials were obtained by the above set forth apparatus and method. Actual results from tires containing similar cord samples were run in the lab on tire test equipment and the depth of the various flat spots and runout times were recorded. FIGURE 4 shows a graph wherein the laboratory flat spotting results were plotted against the results obtained in actual tires. A straight line correlation is evident in FIGURE 4.

Table 1 below sets forth the values obtained for various materials. A comparison is shown between the various reinforcement cord materials.

TABLE 1.—FIBER FLATSPOTTING

|  | Depth | | Runout [1] | |
|---|---|---|---|---|
|  | Lab | Tires | Lab | Tires |
| Rayon | .34 (100) | .110 (100) | .50 (100) | .50 (100) |
| Nylon | .80 (236) | .230 (210) | 8.0 (1,600) | 7.5 (1,500) |
| Polyester | .32 (94) | .100 (91) | .45 (90) | .50 (100) |
| Vinal | .48 (141) | .160 (145) | 4.0 (800) | 5.5 (1,100) |
| HT-1 (Polyamide) | .33 (97) | .107 (97) | .40 (80) | .45 (90) |
| Polyolefin | .48 (141) | .150 (136) | 1.40 (280) | 1.35 (270) |
| Exp. Nylon A | .50 (147) | .150 (137) | 1.40 (230) | 1.6 (320) |
| Exp. Nylon B | .40 (117) | .125 (114) | 1.0 (200) | 1.1 (220) |

[1] To limit of detection.

The first material in Table 1, line 1, is rayon. It has been chosen as base 100. All other values are expressed as ratios thereof. For example, nylon on the second line has a 236 value for the lab flat spot reading, whereas the actual flat spot reading for a tire containing reinforcement cords for the same material is 210. In a similar manner the runout values expressed in units of time are set forth. For nylon a value of 1,600 was obtained in the lab and a value of 1,500 occurred in the actual tire.

While certain representative embodiments and details have been shown for the purpose of illustrating the invention, it will be apparent to those skilled in this art that various changes and modifications may be made therein without departing from the spirit or scope of the invention.

What is claimed is:

1. An apparatus for measuring the physical properties of a reinforcement cord comprising a base member of sufficient area to prevent the apparatus from falling over and having vertical support members attached thereto in spaced apart relationship, a top cross-member and a bottom cross-member spanning the distance between the vertical support members and rigidly attached to said support members, a shaft suspended between the vertical support members in the vicinity of said top cross-member and rigidly attached thereto, a plurality of disc assemblies rotatably mounted remote from each other on said shaft and having the shaft pass through the center perpendicular to the plane in which said disc assemblies lay, said disc assemblies comprising a first disc and a second disc, the first disc having a specimen receiving peripheral surface, the second disc having a graduated indicator scale mounted along the peripheral edge, said first and second discs of different diameters to magnify the extension of a test specimen, indicator blocks mounted on said top cross-member so that they extend toward and terminate adjacent the peripheral scale mounted on said second disc, and specimen attachment lugs rigidly mounted in spaced apart relationship on the bottom cross-member so that a test specimen attached thereon can be tensioned upward and over the surface of said first disc whereby the extension of test specimen can be measured.

2. A method of measuring the flatspotting characteristics of a tire reinforcement cord comprising the steps of;
  (1) Placing at least two lengths of similar reinforcement cord in an apparatus for measuring changes in an axial direction,
  (2) Tensioning both reinforcement cords with a low extension producing load to induce a state of equilibrium,
  (3) Increasing the low extension producing load to a high extensioning load,
  (4) Subjecting the reinforcement cords and apparatus to an elevated temperature until equilibrium is attained in the cords,
  (5) Removing the extension producing load from one of the reinforcement cords so that it is unloaded, (6) Cooling the cords and apparatus to room temperature while noting the change in axial extension of the loaded cord, (7) Reapplying the extension producing load to the unloaded cord, and (8) Raising the temperature of the cords and apparatus while recording the change in extension over a given time interval thus acquiring data to predict the flat-spotting characteristics of the cord.

3. The method of claim 2 wherein steps (2) and (4) are continued until the overall elongation of the cord is less than 0.05% over a time interval of 5 minutes.

4. The method of claim 2 wherein the low extension producing load is in the range of 10 grams.

5. The method of claim 2 wherein the high extension producing load is in the range of 908 grams.

6. The method of claim 2 wherein the elevated temperature of step 4 is in the range of 150° F.

7. The method of claim 2 wherein the elevated temperature of step 8 is in the range of 120° F.

8. An apparatus for comparative measurement of the extension of cords comprising vertical support members attached to a base member, a cross-member attached to said vertical members remote from the base member, a shaft supported in a rigid manner by the vertical support members and oriented so that it is parallel to said cross and base members, at least a pair of disc assemblies each mounted rotatably on the shaft so that it is perpendicular to and concentric thereto, each disc assembly comprising a first disc and a second disc in juxtaposed relationship and so affixed that they rotate together through the same angle, said first disc having a peripheral surface adapted to receive a test cord trained thereover, said second disc being of a substantially larger diameter than the first disc and having indicia on its peripheral surface, an indicator mounted on the cross-member so that it is closely adjacent the indicia carried by said second disc, and test specimen attachment means fixed to the base of said apparatus for the fixing of one end of a pair of cords trained respectively about the first discs of said pair of disc assemblies.

9. Apparatus for comparative measurement of the extension of cords comprising a base, at least a pair of disc assemblies, means mounting said pair of disc assemblies for free rotation about a horizontal common axis extending parallel to said base and disposed substantially above the same, each disc assembly comprising a pair of concentric disc-like members of different diameters fixed for rotation together, the disc of smaller diameter of each assembly having means on the periphery thereof for supporting a cord trained thereover, the other larger diameter disc of each assembly thereof being provided on each periphery with indicia spaced angularly about the axis thereof, means providing an indicator associated with the indicia of each of the larger disc-like members, each indicator being fixed relative to said base, test cord anchoring means fixed relative to said base and below said disc assemblies for the anchoring of one end of each of a pair of cords respectively trained over the smaller diameter disc-like members, and a plurality of weights for attachment to the other ends of each cord trained over the smaller diameter disc-like members.

References Cited by the Examiner

UNITED STATES PATENTS

| | | | |
|---|---|---|---|
| 2,121,423 | 6/1938 | Colbeth | 73—160 X |
| 2,459,738 | 1/1949 | Prettymen et al. | 73—160 X |

DAVID SCHONBERG, *Primary Examiner.*

LOUIS R. PRINCE, *Examiner.*

M. B. HEPPS, *Assistant Examiner.*